No. 806,352. PATENTED DEC. 5, 1905.
J. P. LE GRAND.
PNEUMATIC TIRE.
APPLICATION FILED JULY 2, 1904.

Witnesses:
Paul Fournol
Louis Tailfer

Inventor.
Jean Paul Le Grand

UNITED STATES PATENT OFFICE.

JEAN PAUL LE GRAND, OF LEVALLOIS-PERRET, FRANCE.

PNEUMATIC TIRE.

No. 806,352.            Specification of Letters Patent.            Patented Dec. 5, 1905.

Application filed July 2, 1904. Serial No. 215,199.

*To all whom it may concern:*

Be it known that I, JEAN PAUL LE GRAND, a citizen of the Republic of France, residing in Levallois-Perret, Seine, France, have invented a certain new and useful Improvement in Pneumatic Tires, of which the following is a specification.

This invention has relation to an improved outer covering for pneumatic tires for use on vehicles of all kinds and particularly on automobiles and the like.

The principal object of this invention is the provision of an exterior armored protective strip so adapted to the wall of the pneumatic tire as to be free from strains due to lateral deformation of said tire during use, said mode of fastening being able to accommodate itself to the changes of form incident to use of the tire without any strain on said fastener.

My invention is illustrated in its preferred forms in the accompanying drawings, wherein—

Figure 1:
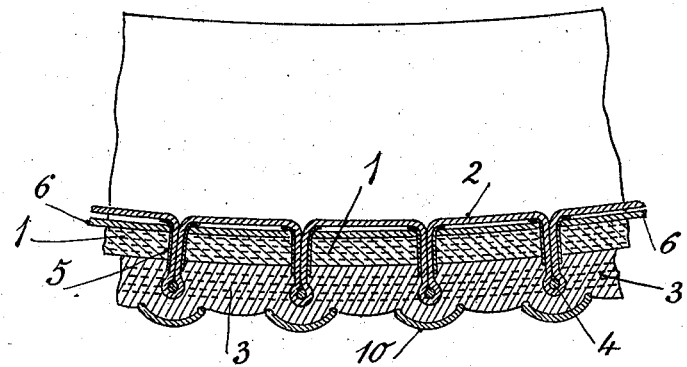
Figure 2:
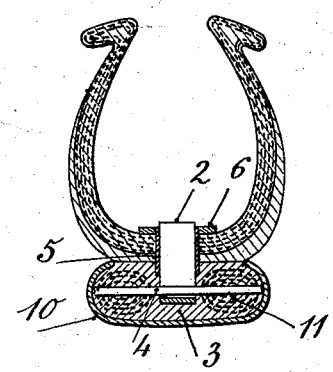
Figure 3:
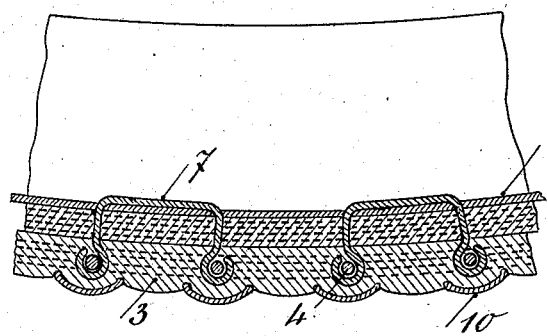
Figure 4:

Figure 1 is a longitudinal section of a portion of a pneumatic tire provided with my improvement. Fig. 2 is a transverse section of the same. Fig. 3 is a view similar to Fig. 1, but showing the modified form of fastening; and Fig. 4 shows in detail a modified form of sectional armor-plate and fastening-pin.

In the drawings the outer wall of the pneumatic tire is shown at 1, and at 2 is shown a continuous securing-strap for holding the improved exterior armored protective strip 3 in place by coöperation with the pins 4, embedded in said protective strip, as hereinafter described. The strap 2 is laid along the interior of the tire and passes out at intervals to embrace the pins 4, as shown, the strap being preferably protected by flat metallic sleeves 5, passing through the outer wall, and also by an interior reinforcing-strip 6, which lies under the strap and through which the straps and the tubes 5 pass. The strap 2 and strip 6 may be made of any flexible material, but preferably of leather or balata.

As shown in Fig. 3, the sectional metallic U-shaped straps 7 may, if desired, be substituted for the continuous strap 2, as shown in Figs. 1 and 2, and in this case the two ends of each strap 7 are bent around successive pairs of pins 4, as shown in the drawings.

The separate armor-plates 10 have the form shown in sections taken at right angles to each other in Figs. 1 and 2, said plates being shown curved in both sections and having their two ends turned inward sufficiently, as shown in Fig. 2, to embrace the rigid pins 4 as well as the flexible protective strip itself. This strip is preferably composed of rolls of canvas 11, embedded in and separated by rubber. The pins 4 traverse this protective belt or strip at intervals, and the strap 2 or 7 passes into the rubber and around said pins to secure the protective strip in place. It will be seen that the armor-plates 10, which embrace the protective strip opposite each pin 4, are so shaped as to prevent withdrawal of the pin, and consequently tearing away of the protective belt from said pin.

As shown in Fig. 4, the pin 4 may be fastened directly to the armor-plate 10, in which case said armor-plate need not be bent up, but may remain flat, as shown in the figure.

The form of protective covering above described is not dependent upon any adherence due to vulcanization and is not subjected to strains due to transverse deformation. The form of fastening employed is independent of all transverse deforming strains and is not subject to any undue strain whatever due to the normal deforming of the tire during use.

What I claim is—

1. In combination with a pneumatic tire, an exterior flexible protective strip, pins traversing the same at intervals, and a strap lying along the inside of the tire-wall and carried through said wall and around said pins, substantially as described.

2. In combination with a pneumatic tire, an exterior flexible protective strip composed of two rolls of canvas united by rubber and having transverse pins embedded therein at intervals, and a fastening-strip lying along the inner wall of the tire and carried out through said wall to surround said pins, substantially as described.

3. In combination with a pneumatic tire, an exterior flexible protective strip, pins traversing the same at intervals, a strap lying along the inner wall of said tire and carried out through said wall to embrace said pins, and separate armor-plates applied to said protective strip at intervals opposite said pins, said armor-plates having their ends bent flat to embrace the ends of said pins, substantially as described.

4. In combination with a pneumatic tire, an exterior flexible protective strip, pins traversing the same at intervals, a securing-strap lying along the inner wall of said tire and looped out through said wall to embrace said pins and flat metal sleeves passing through said wall and surrounding said looped portions of the securing-strap, substantially as described.

JEAN PAUL LE GRAND.

Witnesses:
LOUIS TAILFER,
ROB. COLLONZ.